(12) United States Patent
Yasuda et al.

(10) Patent No.: US 9,853,765 B2
(45) Date of Patent: Dec. 26, 2017

(54) SIGNAL PROCESSING DEVICE AND SIGNAL PROCESSING METHOD FOR OPTICAL POLARIZATION MULTIPLEXED SIGNAL

(71) Applicant: NEC Corporation, Minato-ku, Tokyo (JP)

(72) Inventors: Wakako Yasuda, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/782,838

(22) PCT Filed: Feb. 19, 2014

(86) PCT No.: PCT/JP2014/053853
§ 371 (c)(1),
(2) Date: Oct. 7, 2015

(87) PCT Pub. No.: WO2014/167897
PCT Pub. Date: Oct. 16, 2014

(65) Prior Publication Data
US 2016/0036554 A1    Feb. 4, 2016

(30) Foreign Application Priority Data

Apr. 9, 2013 (JP) ................. 2013-081395

(51) Int. Cl.
*H04J 14/06* (2006.01)
*H04B 10/61* (2013.01)

(52) U.S. Cl.
CPC .......... *H04J 14/06* (2013.01); *H04B 10/6161* (2013.01); *H04B 10/6162* (2013.01); *H04B 10/6163* (2013.01)

(58) Field of Classification Search
CPC .... H04J 14/06; H04B 10/614–10/6163; H04B 10/6166
See application file for complete search history.

(56) References Cited

U.S. PATENT DOCUMENTS 7,636,525 B1 * 12/2009 Bontu .................... H04B 10/60
                                                                398/208
2010/0046961 A1 * 2/2010 Tanimura .................. H03F 3/08
                                                                398/159

(Continued)

FOREIGN PATENT DOCUMENTS

JP    2009-198364 A    9/2009
JP    2010-50578 A     3/2010

(Continued)

OTHER PUBLICATIONS

Liang B. Du and Arthur J. Lowery, "Improved single channel backpropagation for intra-channel fiber nonlinearity compensation in long-haul optical communication systems", Optics Express, vol. 18, No. 16, pp. 17075-17088, 2010.

(Continued)

*Primary Examiner* — Nathan Curs

(57) ABSTRACT

An optical reception device 20 includes an electric signal generation unit 200, a linear compensation unit 301, a nonlinear compensation unit 300, and a second coefficient setting unit 400. The electric signal generation unit 200 generates an electric signal based on an optical signal received over a transmission path 30. The linear compensation unit 301 performs processing for compensating for dispersion that occurs on optical signal in the transmission path 30 to the electric signal, using a first filter coefficient. The second coefficient setting unit 400 determines a second filter coefficient for compensating for a nonlinear effect that occurs on the optical signal in the transmission path 30, using an amount of dispersion that occurs in the transmis- (Continued)

sion path 30. The nonlinear compensation unit 300 performs processing for compensating the electric signal for the nonlinear effect, using the second filter coefficient that is determined by the second coefficient setting unit 400.

12 Claims, 6 Drawing Sheets

(56) References Cited

U.S. PATENT DOCUMENTS

| | | | |
|---|---|---|---|
| 2010/0196017 A1* | 8/2010 | Tanimura | H04B 10/6971 398/159 |
| 2013/0243433 A1* | 9/2013 | Yan | H04B 10/2543 398/65 |
| 2013/0302041 A1* | 11/2013 | Matsui | H04B 10/6161 398/208 |

FOREIGN PATENT DOCUMENTS

| | | |
|---|---|---|
| JP | 2012-186807 A | 9/2012 |
| WO | 2012/111140 A1 | 8/2012 |

OTHER PUBLICATIONS

Lei Li et al., "Implementation Efficient Nonlinear Equalizer Based on Correlated Digital Backpropagation", Proc. Conf. OFC OWW3, 2011.

Wakako Maeda, Daisaku Ogasahara, Jun'ichi Abe, Toshiharu Ito, Manabu Arikawa, Hidemi Noguchi, Kiyoshi Fukuchi, Simple optimization method for nonlinear compensation by filtered backpropagation-based equalization utilizing intra-stage dispersion, Optical Communication (ECOC 2013), 39th European Conference and Exhibition on, 2013. 09, pp. 1-3.

International Search Report for PCT Application No. PCT/JP2014/053853, dated May 27, 2014.

* cited by examiner

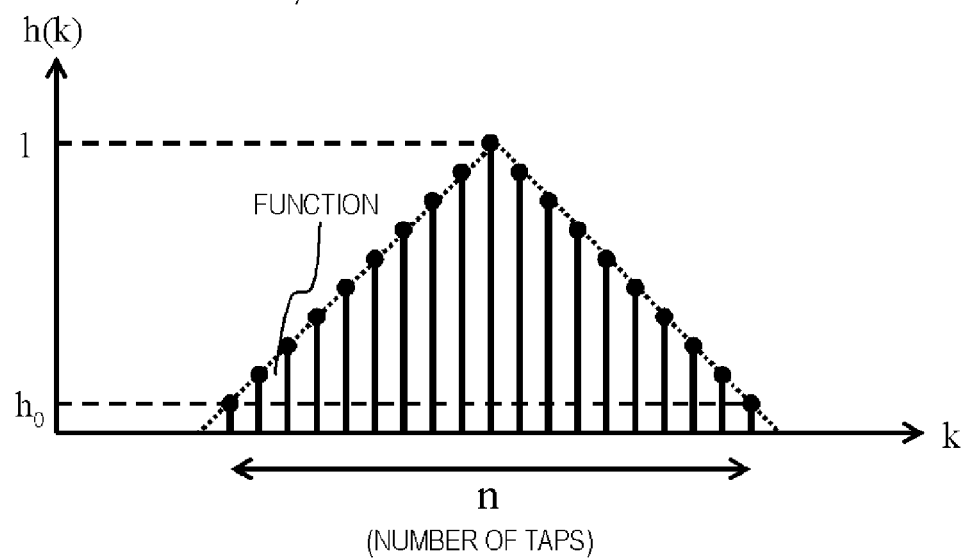

SIGNAL PROCESSING DEVICE AND SIGNAL PROCESSING METHOD FOR OPTICAL POLARIZATION MULTIPLEXED SIGNAL

This application is a National Stage Entry of PCT/JP2014/053853 filed on Feb. 19, 2014, which claims priority from Japanese Patent Application 2013-081395 filed on Apr. 9, 2013, the contents of all of which are incorporated herein by reference, in their entirety.

TECHNICAL FIELD

The present invention relates to a signal processing device and a signal processing method.

BACKGROUND ART

With the spread of the Internet, an amount of data that is communicated is increased. In order to deal with this, there is a need to increase a capacity of a transmission path. As one technology for realizing a greater increase in capacity, there is a multilevel modulation (quadrature amplitude modulation: QAM) scheme. An optical signal on which modulation in compliance with the QAM scheme is performed in a transmitter is demodulated in a digital-coherent type light receiver.

In optical communication in compliance with the QAM scheme, there is a major problem of a nonlinear effect to which the optical signal is subjected upon propagating along the transmission path. When the optical signal is subjected to the nonlinear effect while in the transmission path, a phase of the optical signal is rotated. Because complicated phase information is handled in the QAM scheme, if the optical signal is subjected to phase rotation due to the nonlinear effect, correct phase information cannot be demodulated at the time of receiving.

In contrast, a nonlinear compensation scheme called backpropagation is disclosed in Non-Patent Document 1. This compensation scheme is a scheme in which dispersion compensation is performed little by little and nonlinear compensation is performed immediately after each dispersion compensation operation is performed, and thus waveform distortion is compensated for while a propagation waveform is traced backward from the receiving side to the transmitting side.

However, in the backpropagation, when a dispersion compensation function and a nonlinear compensation function are combined as one nonlinear compensation stage, there is a need to increase the number of stages for the nonlinear compensation. The dispersion compensation function is realized by a linear distortion compensation circuit, and the nonlinear compensation function is realized by a nonlinear distortion compensation circuit. Because the linear distortion compensation circuit performs the dispersion compensation in a frequency domain, the linear distortion circuit includes an FFT/IFFT circuit. Because the FFT/IFFT circuit is large in circuit scale, when a mounting area for an LSI and power consumption are considered, only several FFT/IFFT circuits can be mounted in one signal processing device.

In contrast, a compensation scheme called filtered backpropagation is also disclosed in Non-Patent Document 1. In the filtered backpropagation, an amount of a time average of amounts of phase rotation, which is calculated from a signal strength, is used for the nonlinear compensation, and thus the number of stages for the nonlinear compensation is reduced. Furthermore, in Non-Patent Document 1, a low pass filter is used for the time average of the amounts of phase rotation.

Additionally, a technique for setting a coefficient of the low pass filter described above is disclosed in Non-Patent Document 2. In Non-Patent Document 2, demodulation is performed without the nonlinear compensation being performed on the received optical signal. A difference between a symbol position that is demodulated and an ideal symbol position for the signal is monitored, and thus the coefficient of the low pass filter is determined.

RELATED DOCUMENT

Non-Patent Document

[Non-Patent Document 1] Liang B. Du and Arthur J. Lowery, "Improved single channel backpropagation for intra-channel fiber nonlinearity compensation in long-haul optical communication systems", OPTICS EXPRESS, Vol. 18, No. 16, pp 17075-17088, 2010

[Non-Patent Document 2] Lei Li et al., "Implementation Efficient Nonlinear Equalizer Based on Correlated Digital Backpropagation", Proc. Conf. OFC OWW3, 2011

SUMMARY OF THE INVENTION

Technical Problem

In a method that is disclosed in Non-Patent Literature 2, it is assumed that a signal that is received can be demodulated without the nonlinear compensation. For this reason, the method cannot apply to the received signal of low quality which requires the nonlinear compensation for demodulation.

An object of the present invention is to make it possible to set a coefficient of nonlinear compensation even if demodulation is not performed in a case where optical signal that is polarization multiplexed and multilevel modulated is received and is demodulated.

Solution to Problem

According to an aspect of the present invention, there is provided a signal processing device including: an electric signal generation unit that generates an electric signal based on optical signal which is polarization multiplexed and multilevel modulated and which is transmitted over a transmission path; a linear compensation unit that performs processing which compensates for dispersion that occurs on the optical signal in the transmission path to the electric signal, using a first filter coefficient; a second coefficient setting unit that determines a second coefficient that determines a width on a time axis, which has to be considered when compensating for a nonlinear effect that occurs on the optical signal in the transmission path, using an amount of the dispersion; and a nonlinear compensation unit that compensates the electric signal for the nonlinear effect, using the second filter coefficient.

According to another aspect of the present invention, there is provided a signal processing method including: generating an electric signal based on optical signal which is polarization multiplexed and multilevel modulated and which is transmitted over a transmission path; performing processing which compensates for dispersion that occurs on the optical signal in the transmission path to the electric signal, using a first filter coefficient; determining a second filter coefficient that determines a width on a time axis, which has to be considered when compensating for a nonlinear effect that occurs on the optical signal in the transmission path, using an amount of the dispersion; and compensating the electric signal for the nonlinear effect, using the second filter coefficient.

Advantageous Effects of Invention

According to the present invention, a coefficient of nonlinear compensation can be set even if demodulation is not performed in a case where optical signal that is polarization multiplexed and multilevel modulated is received and is demodulated.

BRIEF DESCRIPTION OF THE DRAWINGS

The objects described above, and other objects, features and advantages are further made apparent by suitable exemplary embodiments described below and the following accompanying drawings.

FIG. 6 is a diagram for describing processing by a number-of-taps calculation unit and by a second coefficient calculation unit in detail.

DESCRIPTION OF EXEMPLARY EMBODIMENTS

Figure 1:
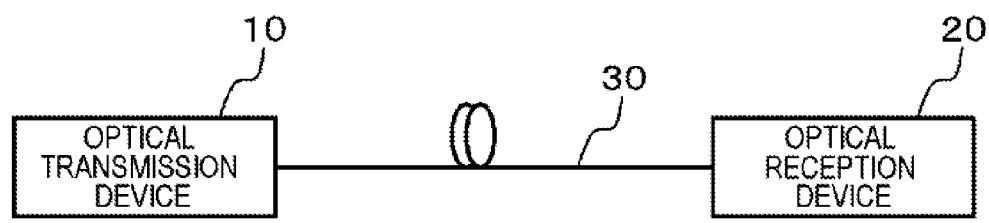
FIG. 1 is a diagram illustrating a configuration of an optical communication system relating to a first exemplary embodiment.

Exemplary embodiments of the present invention are described referring to the drawings. Moreover, in all the drawings, like constituent elements are given like reference numerals, respectively, and descriptions thereof will not be repeated.

First Exemplary Embodiment

FIG. 1 is a diagram illustrating a configuration of an optical communication system according to a first exemplary embodiment. The optical communication system according to the present exemplary embodiment includes an optical transmission device 10 and an optical reception device 20. The optical transmission device 10 and the optical reception device 20 are connected to each other through a transmission path 30. The transmission path 30 is configured using an optical fiber or the like. The optical communication system is a system that communicates using a quadrature amplitude modulation (QAM) scheme.

An optical transmission device 10 (a signal processing device) generates an optical signal that is polarization multiplexed and multilevel modulated, by modulating light using multiple signals that are to be transmitted. The generated optical signal is transmitted to the optical reception device 20 over the transmission path 30. The optical reception device 20 demodulates the received optical signal. When propagating along the transmission path 30, the optical signal is subjected to a linear effect (a dispersion effect) and a nonlinear effect. The optical reception device 20 performs processing for compensating for these effects.

Figure 2:
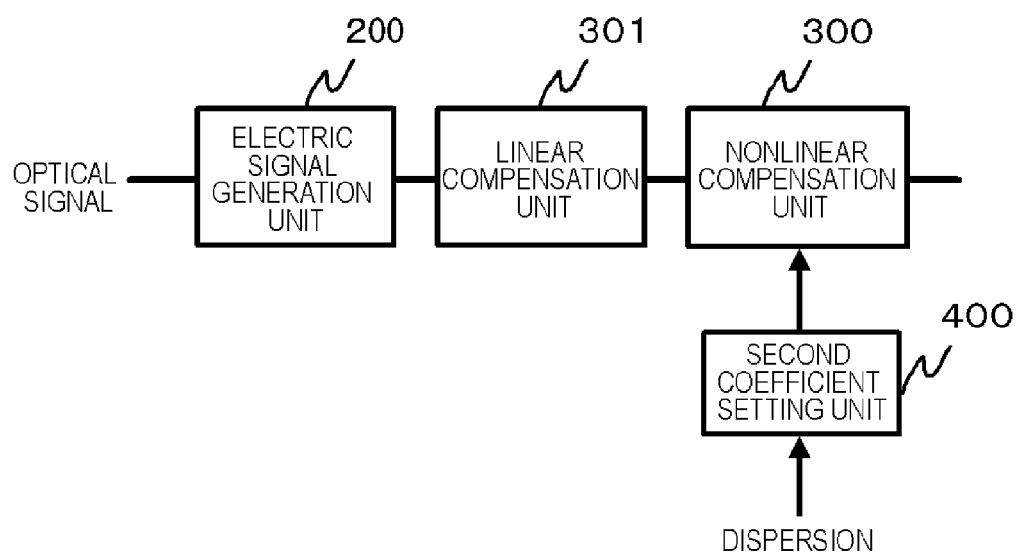
FIG. 2 is a diagram illustrating one example of a functional configuration of an optical reception device.

FIG. 2 is a diagram illustrating one example of a functional configuration of the optical reception device 20. The optical reception device 20 includes an electric signal generation unit 200, a linear compensation unit 301, a nonlinear compensation unit 300, and a second coefficient setting unit 400. The electric signal generation unit 200 generates an electric signal, based on the optical signal that is received over the transmission path 30. The linear compensation unit 301 performs processing for compensating for dispersion that occurs on optical signal in the transmission path 30, on the electric signal, using a first filter coefficient. The second coefficient setting unit 400 determines a second filter coefficient for compensating for the nonlinear effect that occurs on the optical signal along the transmission path, using an amount of dispersion that occurs in the transmission path 30. The nonlinear compensation unit 300 performs processing for compensating for the nonlinear effect, on the electric signal, using the second filter coefficient that is determined by the second coefficient setting unit 400.

The optical signal is a pulse signal. Then, the nonlinear effect to which the optical signal is subjected while being transmitted over the transmission path 30 occurs because a certain pulse on a time axis is subjected to an influence of the certain pulse itself and a pulse that is positioned adjacent to the certain pulse. For this reason, the nonlinear effect to which the pulse is subjected is determined by an expansion of the width of the pulse. On the other hand, the expansion of the width of the pulse is determined by an amount of dispersion of the optical signal. Therefore, when the second filter coefficient is determined using the amount of dispersion that occurs in the transmission path 30, the nonlinear effect can be compensated for with high accuracy. For this reason, even if modulation is not performed, a coefficient for nonlinear compensation can be set.

If configurations of the optical communication system and of the transmission path 30 are determined, the amount of dispersion that occurs in the transmission path is determined almost uniquely. Therefore, according to the present exemplary embodiment, after the optical transmission device 10 and the optical reception device 20 are installed, when the amount of dispersion that occurs in the transmission path 30 is measured, the second filter coefficient can be determined.

Second Exemplary Embodiment

An optical communication system according to the present exemplary embodiment has the same configuration as the optical communication system according to the first exemplary embodiment except for a configuration of the optical reception device 20.

Figure 3:
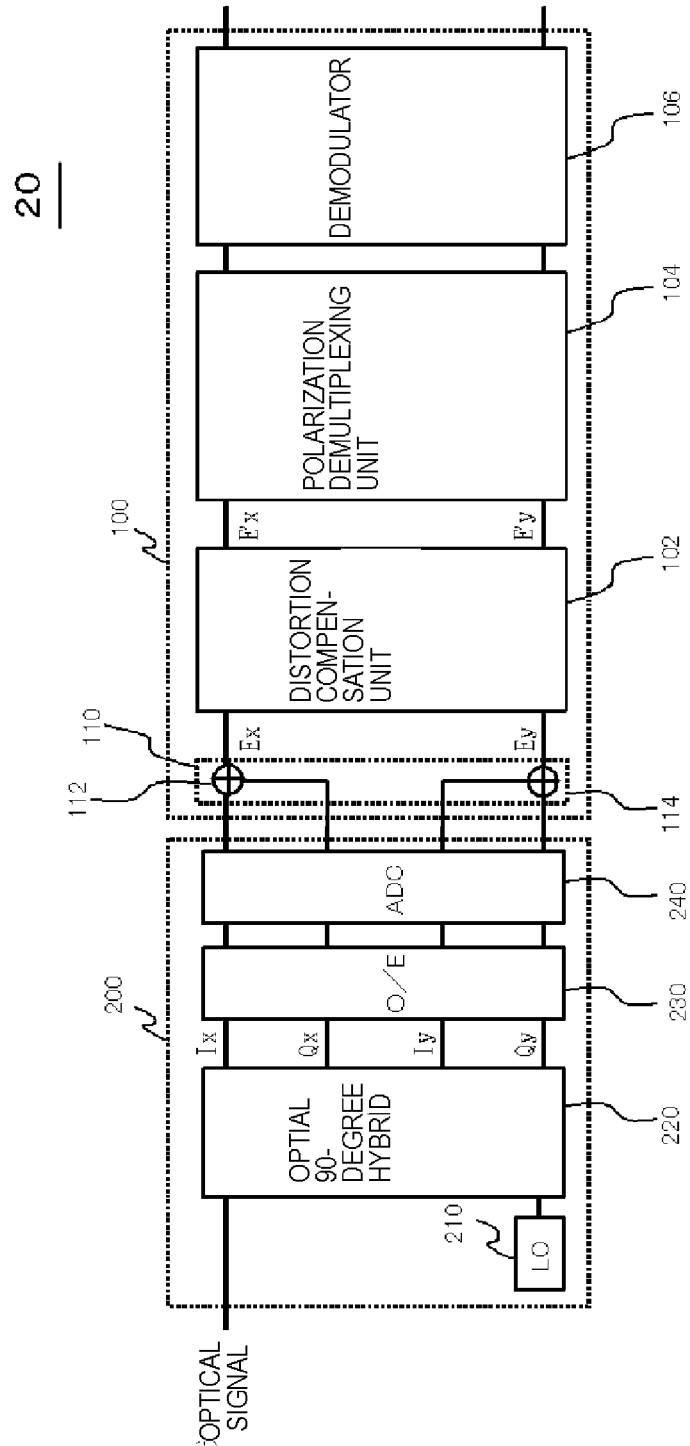
FIG. 3 is a diagram illustrating a functional configuration of an optical reception device according to a second exemplary embodiment.

FIG. 3 is a diagram illustrating a functional configuration of the optical reception device 20. The optical reception device 20 includes a local optical source (LO) 210, an optical 90-degree hybrid 220 (an interference unit), an optical-to-electric (O/E) converter 230, an analog-to-digital (AD) converter (ADC) 240, and a signal processing unit 100. The signal processing unit 100 is configured as one semiconductor device.

An optical signal and a local light from the local optical source 210 are input into the optical 90-degree hybrid 220. The optical 90-degree hybrid 220 causes the optical signal and the local light to interfere with each other with a phase difference of 0 and thus generates a first optical signal ($I_x$) and causes the optical signal and the local light to interfere with each other with a phase difference of π/2 and thus generates a second optical signal ($Q_x$). Furthermore, the optical 90-degree hybrid 220 causes the optical signal and the local light to interfere with each other with a phase difference of 0 and thus generates a third optical signal ($I_y$) and causes the optical signal and the local light to interfere with each other with a phase difference of π/2 and thus generates a fourth optical signal ($Q_y$). The first optical signal and the second optical signal form a set of signals and the third optical signal and the fourth optical signal form a set of signals.

The optical-to-electric converter 230 performs optical-to-electric conversion on four optical signals (output lights) that are generated by the optical 90-degree hybrid 220, and thus generates four analog signals.

The AD converter 240 converts each of the four analog signals that are generated by the optical-to-electric converter 230, into a digital signal (quantization).

The signal processing unit 100 processes the four digital signals that are generated by the AD converter 240 and thus generates a demodulation signal that results from demodulating the optical signal. Specifically, the signal processing unit 100 includes a polarization signal generation unit 110, a distortion compensation unit 102, a polarization demultiplexing unit 104, and a demodulator 106.

The polarization signal generation unit 110 includes addition units 112 and 114. The addition unit 112 performs addition processing on the digital signal that is generated from the first optical signal ($I_x$) and the digital signal that is generated from the second optical signal ($Q_x$) and thus generates a first polarization signal ($E_x$). The addition unit 114 performs addition processing on the digital signal that is generated from the third optical signal ($I_y$) and the digital signal that is generated from the fourth optical signal ($Q_y$) and thus generates a second polarization signal ($E_y$). Specifically, $E_x$ and $E_y$ are obtained according to Expressions (1) and (2) as follows.

[Math. 1]

$$E_x = I_x + jQ_x \quad (1)$$

[Math. 2]

$$E_y = I_y + jQ_y \quad (2)$$

The distortion compensation unit 102 performs the processing for compensating for the linear effect and the non-linear effect to which the optical signal is subjected while propagating along the transmission path 30. The distortion compensation unit 102 will be described in detail below.

The polarization demultiplexing unit 104 performs filter calculation for each polarization. The demodulator 106 compensates for a frequency difference and a phase difference between the optical signal and the local light, and demodulates the signal that is transmitted.

Figure 4:
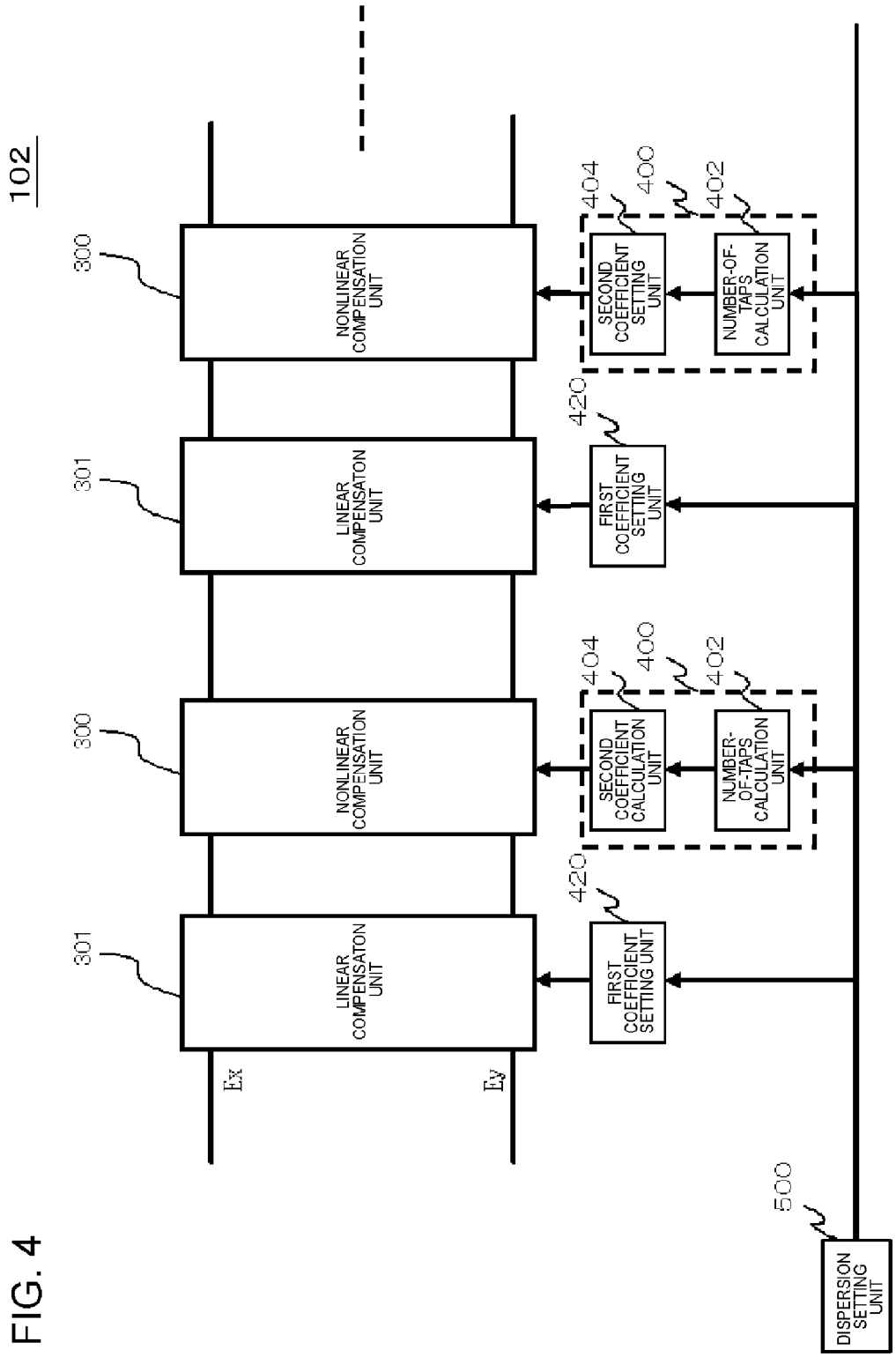
FIG. 4 is a diagram for describing a functional configuration of a distortion compensation unit.

FIG. 4 is a diagram for describing a functional configuration of the distortion compensation unit 102. The distortion compensation unit 102 has at least one processing stage including a linear compensation unit 301 and a nonlinear compensation unit 300. Moreover, in a case where the number of processing stages is small (for example, equal to or smaller than five stages), it is preferable that the final stage in the distortion compensation unit 102 is the linear compensation unit 301 (a second dispersion compensation unit). However, in a case where the number of processing stages is equal to or greater than ten stages, the final stage in the distortion compensation unit 102 may not be the linear compensation unit 301.

Moreover, even in any cases where the final stage in the distortion compensation unit 102 is the linear compensation unit 301 and where the final stage therein is the nonlinear compensation unit 300, a sum of amounts of dispersion compensation that is performed by the linear compensation unit 301 included in the distortion compensation unit 102 is equal to an amount of dispersion that the optical signal receives while in the transmission path 30.

The linear compensation unit 301 compensates for the linear effect to which the optical signal is subjected while in the transmission path 30. The linear compensation unit 301 includes, for example, a fast Fourier transform (FFT) unit, a filter unit, and an inverse fast Fourier transform (IFFT) unit. The FFT performs FFT calculation on a signal that is input. The filter unit performs filter calculation on the signal, using the first filter coefficient for compensating for the dispersion effect to which the optical signal is subjected in the transmission path. The IFFT unit performs IFFT calculation on the signal on which the filter processing is performed.

The nonlinear compensation unit 300 compensates for the nonlinear effect to which the optical signal is subjected in the transmission path 30, using the second filter coefficient.

Furthermore, the distortion compensation unit 102 includes a first coefficient setting unit 420 and the second coefficient setting unit 400. The first coefficient setting unit 420 sets the first filter coefficient in the linear compensation unit 301. The first filter coefficient may be calculated by the first coefficient setting unit 420 using the dispersion to which the optical signal is subjected in the transmission path 30, and may be directly input into the first coefficient setting unit 420 from the outside.

The second coefficient setting unit 400 includes a number-of-taps calculation unit 402 and a second coefficient calculation unit 404. The number-of-taps calculation unit 402 determines the number of taps using the dispersion to which the optical signal is subjected in the transmission path 30. The second coefficient calculation unit 404 separates a predetermined function at equal intervals into sections of which the number is the same as the number of taps, and sets a value of a function in each of the multiple sections as the second filter coefficient. Then, the second coefficient calculation unit 404 sets the calculated second filter coefficient in the nonlinear compensation unit 300. Setting processing of the second coefficient by the second coefficient setting unit 400 will be described in detail below.

Moreover, the dispersion to which the optical signal is subjected while in the transmission path 30 is input from a dispersion setting unit 500.

Figure 5:
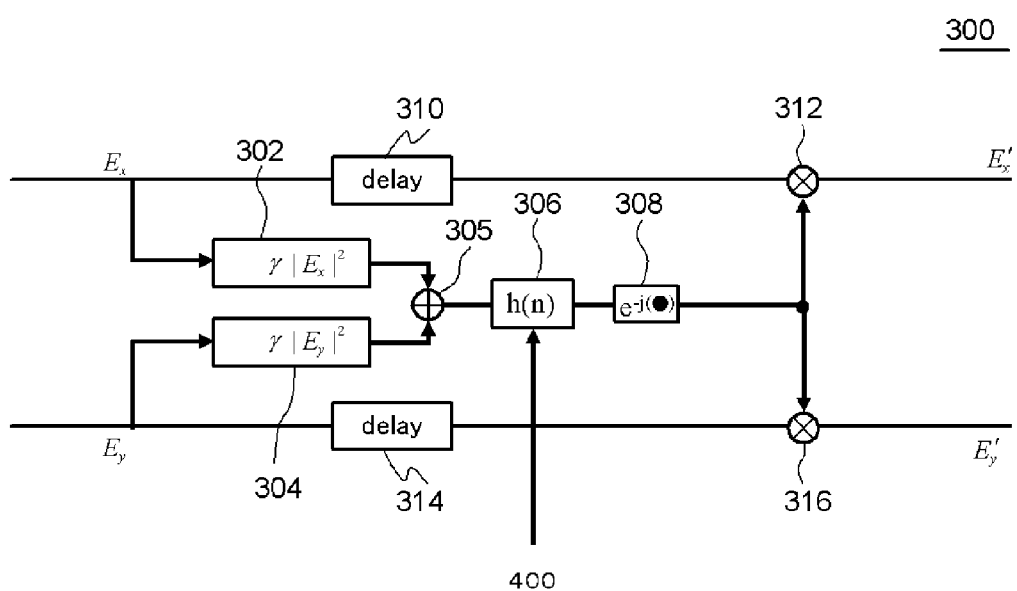
FIG. 5 is a diagram illustrating one example of a functional configuration of a nonlinear compensation unit.

FIG. 5 is a diagram illustrating one example of a functional configuration of the nonlinear compensation unit 300. In the example in FIG. 5, the nonlinear compensation unit 300 performs compensation processing in compliance with filtered back propagation. However, the nonlinear compensation unit 300 may perform processing in compliance with a different scheme.

The nonlinear compensation unit 300 includes strength calculation units 302 and 304, an addition unit 305, a filter unit 306, a phase modulator 308, delay units 310 and 314, and multiplication units 312 and 316. The strength calculation unit 302 calculates a strength of a polarization signal $E_x$ and calculates an amount of phase rotation that is based on the strength. The strength calculation unit 304 calculates a strength of a polarization signal $E_y$ and calculates an amount of phase rotation that is based on the strength. The addition unit 305 adds the amount of phase rotation that is calculated by the strength calculation unit 302, and the amount of phase rotation that is calculated by the strength calculation unit 304. The filter unit 306 multiplies the amount of phase rotation that is output by the addition unit 305 by a coefficient (the second filter coefficient: h(n), which is described above) for temporal averaging. The phase modulator 308 uses the amount of phase rotation after being processed by the filter unit 306, and thus calculates a coefficient for compensating for phase rotation. Then, this coefficient is multiplied by the polarization signal $E_x$ after being delayed by the delay unit 310 by the multiplication unit 312, and is multiplied by the polarization signal $E_y$ after being delayed by the delay unit 314 by a multiplication unit 316. Moreover, the delay units 310 and 314 are provided to synchronize the polarization signals $E_x$ and $E_y$ to a coefficient calculation timing.

Moreover, the nonlinear compensation unit 300 that is illustrated in FIG. 5 performs processing in compliance with Expressions (3) and (4) as follows.

[Math. 3]

$$E'_x(k) = E_x(k)\exp\left[-j\sum_{m=0}^{n-1} h(n)\gamma(|E_x(k-m)|^2 + |E_y(k-m)|^2)\right] \quad (3)$$

[Math. 4]

$$E'_y(k) = E_y(k)\exp\left[-j\sum_{m=0}^{n-1} h(n)\gamma(|E_x(k-m)|^2 + |E_y(k-m)|^2)\right] \quad (4)$$

FIG. 6 is a diagram for describing processing by the number-of-taps calculation unit 402 and by the second coefficient calculation unit 404 in detail.

As described according to the first exemplary embodiment, the nonlinear effect to which the optical signal is subjected upon being transmitted over the transmission path 30 occurs because a certain pulse on a time axis is subjected to an influence of the certain pulse itself and a pulse that is positioned adjacent to the certain pulse. For this reason, the nonlinear effect to which the pulse is subjected is determined by an expansion of the width of the pulse. Therefore, the larger the dispersion, the greater the width of the pulse, and a time width becomes greater that has to be considered upon calculating the amount of phase rotation that results from the nonlinear effect.

On the other hand, the second coefficient calculation unit 404 separates a predetermined function at equal intervals into sections of which the number is the same as the number of taps, and sets a value of a function in each of the sections as the second filter coefficient.

Then, the number-of-taps calculation unit 402 multiplies the amount of dispersion by a proportional coefficient, and thus calculates the number of taps. Thereby, as the dispersion is larger, the number of taps is increased. As a result, the time width becomes greater that is set in the second coefficient calculation unit 404.

Moreover, the proportional coefficient, for example, is set by a manager of the optical communication system based on the function and the dispersion that are used by the second coefficient calculation unit 404.

Furthermore, in an example in FIG. 6, a function used by the second coefficient calculation unit 404 is determined in such a manner that the function has a maximum value in a tap that is positioned in the center and has minimum values in taps that are positioned in both of the ends. In the example in FIG. 6, the tap that is positioned in the center and the taps that are positioned at both of the ends are connected by a straight line, but may be connected by a curved line.

Furthermore, in the function that is used by the second coefficient calculation unit 404, the maximum value, the minimum value, and the shape of a line that connects the maximum value and the minimum value are fixed, but the number of taps from the maximum value to the minimum value is not fixed. Then, a line (that is, a function) connecting the maximum value and the minimum value is divided into as many sections as the number that is half the number of taps, and the second filter coefficient corresponding to each tap is determined as a value of the function in each of the multiple sections. For this reason, in a case where the number of taps that is calculated by the number-of-taps calculation unit 402 is increased, a difference of two second filter coefficients that correspond to taps adjacent to each other becomes smaller.

According to the present exemplary embodiment, even if the demodulation is not performed, the second filter coefficient used in the nonlinear compensation can be set.

The exemplary embodiments of the present invention are described above referring the drawings, but these are only examples of the present invention, and various configurations other than the configurations described above may be employed.

This application claims priority from Japanese Patent Application No. 2013-081395, filed on Apr. 9, 2013, the contents of which are incorporated by reference herein in its entirety.

The invention claimed is:

1. A signal processing device comprising:
an electric signal generation unit that generates electrical signals Ex and Ey based on optical signal which is polarization multiplexed and multilevel modulated and which is transmitted over a transmission path, the electric signal Ex corresponding to a first polarization component of the optical signal and the electric signal Ey corresponding to a second polarization component of the optical signal;
a linear compensation unit that performs processing which compensates for dispersion that occurs on the optical signal in the transmission path to the electric signals Ex and Ey, using a first filter coefficient;
a second coefficient setting unit that determines a second filter coefficient corresponding to a width on a time axis to be considered upon compensating for a nonlinear effect that occurs on the optical signal in the transmission path, using an amount of the dispersion; and
a nonlinear effect compensation unit that compensates the electric signals Ex and Ey for the nonlinear effect, using the second filter coefficient,
wherein the compensations of the nonlinear effect compensation unit are expressed by:

$$E'_x(k) = E_x(k)\exp\left[-j\sum_{m=0}^{n-1} h(n)\gamma(|E_x(k-m)|^2 + |E_y(k-m)|^2)\right]; \text{ and}$$

$$E'_y(k) = E_y(k)\exp\left[-j\sum_{m=0}^{n-1} h(n)\gamma(|E_x(k-m)|^2 + |E_y(k-m)|^2)\right]$$

wherein the second coefficient setting unit determines a number of taps using the amount of the dispersion,
wherein h(n) is the second filter coefficient, and
wherein the second filter coefficient separates a predetermined function at equal intervals into sections of which the number is the same as the number of taps, and sets a value of the function in each of a plurality of the sections as the second filter coefficient.

2. The signal processing device according to claim 1, wherein the function is determined in such a manner that the function has a maximum value in a tap that is positioned in a center and has minimum values in taps that are positioned in both ends.

3. The signal processing device according to claim 1, wherein the second coefficient setting unit calculates the number of taps by multiplying the amount of the dispersion by a proportional coefficient.

4. The signal processing device according to claim 3, wherein the proportional coefficient is set based on the function and the dispersion.

5. The signal processing device according to claim 1, wherein the electric signal generation unit includes
an interference unit that generates four output lights by causing the optical signal and local light to interfere with each other,
an optical-to-electric converter that performs optical-to-electric conversion on the four optical signals and thus generates four analog signals,
an analog-to-digital converter that converts the four analog signals into four digital signals, and
a polarization signal generation unit that generates two polarization signals which correspond to two polarization components of the optical signal, as the electric signals Ex and Ey, from the four digital signals.

6. The signal processing device according to claim 1, wherein the amount of the dispersion indicates dispersion in the transmission path, and
wherein the amount of the dispersion is determined in advance.

7. A signal processing method comprising:
generating electrical signals Ex and Ey based on optical signal which is polarization multiplexed and multilevel modulated and which is transmitted over a transmission path, the electric signal Ex corresponding to a first polarization component of the optical signal and the electric signal Ey corresponding to a second polarization component of the optical signal;
performing processing which compensates for dispersion that occurs on the optical signal in the transmission path to the electric signals Ex and Ey, using a first filter coefficient;
determining a second filter coefficient corresponding to a width on a time axis to be considered upon compensating for a nonlinear effect that occurs on the optical signal in the transmission path, using an amount of the dispersion; and
compensating the electric signals Ex and Ey for the nonlinear effect, using the second filter coefficient,
wherein the compensations of the nonlinear effect are expressed by:

$$E'_x(k) = E_x(k)\exp\left[-j\sum_{m=0}^{n-1} h(n)\gamma(|E_x(k-m)|^2 + |E_y(k-m)|^2)\right]; \text{ and}$$

$$E'_y(k) = E_y(k)\exp\left[-j\sum_{m=0}^{n-1} h(n)\gamma(|E_x(k-m)|^2 + |E_y(k-m)|^2)\right]$$

wherein the determining the second filter coefficient comprises determining a number of taps using the amount of the dispersion,
wherein h(n) is the second filter coefficient, and
wherein the second filter coefficient separates a predetermined function at equal intervals into sections of which the number is the same as the number of taps, and sets a value of the function in each of a plurality of the sections as the second filter coefficient.

8. The signal processing method according to claim 7, wherein the function is determined in such a manner that the function has a maximum value in a tap that is positioned in a center and has minimum values in taps that are positioned in both ends.

9. The signal processing method according to claim 7, wherein the number of taps is calculated by multiplying the amount of the dispersion by a proportional coefficient.

10. The signal processing method according to claim 9, wherein the proportional coefficient is set based on the function and the dispersion.

11. A signal processing device comprising:
an electric signal generation unit that generates electrical signals Ex and Ey based on an optical signal which is polarization multiplexed and multilevel modulated and which is transmitted over a transmission path, the electric signal Ex corresponding to a first polarization component of the optical signal and the electric signal Ey corresponding to a second polarization component of the optical signal;
a linear compensation unit that performs processing using a first filter coefficient;
a second coefficient setting unit that determines a number of taps and calculates a second filter coefficient based on a predetermined function, the predetermined function being separated into a plurality of sections of which a number is the same as the number of taps; and
a nonlinear effect compensation unit that compensates the electric signals Ex and Ey for a nonlinear effect, using the second filter coefficient,
wherein the compensations of the nonlinear effect compensation unit are expressed by:

$$E'_x(k) = E_x(k)\exp\left[-j\sum_{m=0}^{n-1} h(n)\gamma(|E_x(k-m)|^2 + |E_y(k-m)|^2)\right]; \text{ and}$$

$$E'_y(k) = E_y(k)\exp\left[-j\sum_{m=0}^{n-1} h(n)\gamma(|E_x(k-m)|^2 + |E_y(k-m)|^2)\right]$$

wherein h(n) is the second filter coefficient.

12. The signal processing method according to claim 7, wherein the amount of the dispersion indicates dispersion in the transmission path, and
wherein the amount of the dispersion is determined in advance.

* * * * *